US009110830B2

(12) United States Patent
Dieffenderfer et al.

(10) Patent No.: US 9,110,830 B2
(45) Date of Patent: Aug. 18, 2015

(54) DETERMINING CACHE HIT/MISS OF ALIASED ADDRESSES IN VIRTUALLY-TAGGED CACHE(S), AND RELATED SYSTEMS AND METHODS (75) Inventors: James Norris Dieffenderfer, Apex, NC (US); Robert D. Clancy, Cary, NC (US); Thomas Philip Speier, Raleigh, NC (US)

(73) Assignee: QUALCOMM Incorporated, San Diego, CA (US)

( * ) Notice: Subject to any disclaimer, the term of this patent is extended or adjusted under 35 U.S.C. 154(b) by 175 days.

(21) Appl. No.: 13/478,149

(22) Filed: May 23, 2012

(65) Prior Publication Data
US 2013/0185520 A1    Jul. 18, 2013

Related U.S. Application Data (60) Provisional application No. 61/587,756, filed on Jan. 18, 2012.

(51) Int. Cl.
*G06F 12/08* (2006.01)
*G06F 12/10* (2006.01)

(52) U.S. Cl.
CPC ........ *G06F 12/1063* (2013.01); *G06F 12/1045* (2013.01)

(58) Field of Classification Search
CPC ...................................................... G06F 12/10
USPC .................. 711/103, 162, 166, 170, 202, E12
See application file for complete search history.

(56) References Cited

U.S. PATENT DOCUMENTS

| 5,930,833 | A | 7/1999 | Yoshioka et al. |
|---|---|---|---|
| 6,138,226 | A * | 10/2000 | Yoshioka et al. ............. 711/210 |
| 6,175,906 | B1 * | 1/2001 | Christie ........................ 711/207 |
| 6,298,411 | B1 * | 10/2001 | Giacalone ........................ 711/3 |
| 7,870,325 | B2 | 1/2011 | Joukan et al. |
| 7,958,318 | B2 | 6/2011 | Sakata et al. |
| 8,041,894 | B2 | 10/2011 | Krumm et al. |
| 2007/0033318 | A1 | 2/2007 | Gilday et al. |

(Continued)

OTHER PUBLICATIONS

Xu et al. ("Unified vs. Split TLBs and Caches in Shared-Memory MP Systems", Parallel Processing Symposium, 1995. Proceedings., 9th International Apr. 25-28, 1995, pp. 398-403).*
Xu et al. ("Unified vs. Split TLBs and Caches in Shared-Memory MP Systems", Parallel Processing Symposium, 1995. Proceedings, 9th International Apr. 25-28, 1995, pp. 398-403).*
International Search Report and Written Opinion—PCT/US2013/021849—ISA/EPO—Jul. 19, 2013.

(Continued)

*Primary Examiner* — Aimee Li
*Assistant Examiner* — Tracy Chan
(74) *Attorney, Agent, or Firm* — Paul S. Holdaway (57) ABSTRACT Apparatuses and related systems and methods for determining cache hit/miss of aliased addresses in virtually-tagged cache(s) are disclosed. In one embodiment, virtual aliasing cache hit/miss detector for a VIVT cache is provided. The detector comprises a TLB configured to receive a first virtual address and a second virtual address from the VIVT cache resulting from an indexed read into the VIVT cache based on the first virtual address. The TLB is further configured to generate first and second physical addresses translated from the first and second virtual addresses, respectively. The detector further comprises a comparator configured to receive the first and second physical addresses and effectuate a generation of an aliased cache hit/miss indicator based on a comparison of the first and second physical addresses. In this manner, the virtual aliasing cache hit/miss detector correctly generates cache hits and cache misses, even in the presence of aliased addressing.

29 Claims, 5 Drawing Sheets (56) References Cited

U.S. PATENT DOCUMENTS

| | | |
|---|---|---|
| 2007/0250666 A1* | 10/2007 | Sartorius et al. ............. 711/133 |
| 2011/0145542 A1* | 6/2011 | Morrow ........................ 711/207 |
| 2011/0231593 A1 | 9/2011 | Yasufuku et al. |
| 2012/0185668 A1* | 7/2012 | Joo ............................... 711/207 |
| 2013/0086290 A1* | 4/2013 | Venkumahanti et al. ..... 710/264 |
| 2013/0111183 A1* | 5/2013 | Shirahige ..................... 711/206 |

OTHER PUBLICATIONS

Chen, J.B., et al., "A Simulation Based Study of TLB Performance", Proceedings of the Annual International Symposium on Computer Architecture. Gold Coast, Australia, May 19-21, 1992; [Proceedings of the Annual International Symposium on Computer Architecture], New York, IEEE, US, vol. Symp. 19, May 19, 1992, pp. 114-123, XP000325796, ISBN: 978-0-89791-510-6.

Taiwan Search Report—TW102102094—Tipo—Mar. 17, 2015.

\* cited by examiner

FIG. 5

DETERMINING CACHE HIT/MISS OF ALIASED ADDRESSES IN VIRTUALLY-TAGGED CACHE(S), AND RELATED SYSTEMS AND METHODS

PRIORITY APPLICATION

The present application claims priority to U.S. Provisional Patent Application Ser. No. 61/587,756 entitled "METHOD FOR DETERMINING HIT/MISS OF ALIASED ADDRESSES IN A VIRTUALLY TAGGED CACHE" filed on Jan. 18, 2012, which is hereby incorporated herein by reference in its entirety.

BACKGROUND

I. Field of the Disclosure

The technology of the disclosure relates generally to virtually-tagged memory caches capable of containing cache entries for virtual aliased addresses.

II. Background

Virtual addressing may be employed in a computer system. In such computer systems, when performing a memory-based operation (e.g., a read or a write), a virtual address (VA) provided by the operation is translated to a physical address (PA) to perform the operation. One or more caches may be employed in such systems to reduce memory access times. In this regard, a virtually-addressed cache (VAC) may be employed in a computer system employing virtual addressing. Virtually addressed caches allow faster processing, because they do not require address translation when requested data is found in the cache. If data stored at a physical address pointed to by a virtual address that is the subject of an operation is contained in the VAC, main memory does not have to be accessed. If a VAC is also virtually-tagged, the VAC is a virtually-indexed virtually-tagged cache (VIVT cache). In a VIVT cache, a virtual address that is the subject of an operation is used to index a virtual tag stored in the VIVT cache. The virtual tag is used to determine a cache hit or cache miss for the virtual address. If a cache hit occurs, the data stored in the VIVT cache associated with the index is provided. As a result, further memory access to lower level caches or main memory is avoided.

Faster cache access times of a VIVT cache come with a cost. Architectures using a VIVT cache encounter problems with synonyms that may require costly additional circuitry and complexity to avoid incoherency issues in the VIVT cache. Synonyms may also be referred to as "virtual aliased addresses." Virtual aliased addresses are created when two or more different virtual addresses translate to a same physical address. Because of virtual aliased addresses, a VIVT cache may generate a miss, even when data stored at the physical address corresponding to the virtual address is contained in the VIVT cache. In other words, a VIVT cache may report a false miss. This can occur, for example, when a first virtual address and a second virtual address each point to the same physical address. Consider a scenario when a tag corresponding to the first virtual address is contained in the VIVT cache, but a tag corresponding to the second virtual address is not contained in the VIVT cache. If a read operation is performed on the second virtual address, the VIVT cache will report a miss, because a tag corresponding to the second virtual address is not contained in the VIVT cache. However, the data for the physical address corresponding to the second virtual address is contained in the VIVT cache in an entry corresponding to the first virtual address. Thus, the miss generated by the VIVT cache is a false miss. For a read operation, one consequence of this false miss is a performance penalty. Because the VIVT cache reported a miss, the processing system will attempt to access the data from a secondary cache or main memory (resulting in a longer access time). Another consequence of the reported VIVT cache miss for a read operation could be data incoherency. In the event that the aliased data in the cache is dirty, the read will attempt to access the data from a secondary cache or main memory, both of which have a stale copy of the data.

For a write operation, the consequence of this false miss is data incoherency. Because the VIVT cache generates a false miss, the entry in the VIVT cache corresponding to the first virtual address (also corresponding to the same physical address as the second virtual address) will not be overwritten with the new data from the write operation. The write operation will cause other memory (e.g., an entry corresponding to the physical address in a secondary cache and/or main memory) to store the new data. However, a subsequent read operation performed on the first physical address would result in the VIVT cache returning incorrect data (the old data) no longer stored at the corresponding physical address.

SUMMARY OF THE DISCLOSURE

Embodiments disclosed in the detailed description include apparatuses and related systems and methods for determining cache hit/miss of aliased addresses in virtually-tagged cache(s). In this regard in one embodiment, a virtual aliasing cache hit/miss detector for a virtually-indexed virtually-tagged cache (VIVT cache) is provided. The virtual aliasing cache hit/miss detector comprises a translation lookaside buffer (TLB). The TLB is configured to receive a first virtual address and a second virtual address comprised of a tag of a cache entry resulting from an indexed read into a VIVT cache based on the first virtual address. The TLB is further configured to generate a first physical address translated from the first virtual address. The TLB is further configured to generate a second physical address translated from the second virtual address. The virtual aliasing cache hit/miss detector further comprises a comparator. The comparator is configured to receive the first physical address and the second physical address. The comparator is further configured to effectuate a generation of an aliased cache hit/miss indicator based on a comparison of the first physical address to the second physical address.

In this manner, the virtual aliasing cache hit/miss detector correctly generates cache hits and cache misses for the VIVT cache, even in the presence of aliased addressing (i.e., synonyms). By avoiding generating false cache misses in the presence of aliased addressing, the virtual aliasing cache hit/miss detector can avoid performance penalties associated with generating false cache misses and/or data incoherency problems associated with generating false cache misses.

In another embodiment, a virtual aliasing cache hit/miss detector for a virtually-indexed virtually-tagged cache (VIVT cache) is provided. The virtual aliasing cache hit/miss detector comprises a translation lookaside buffer (TLB) means. The TLB means is configured to receive a first virtual address and a second virtual address comprised of a tag of a cache entry resulting from an indexed read into a VIVT cache based on the first virtual address. The TLB means is further configured to generate a first physical address translated from the first virtual address. The TLB means is further configured to generate a second physical address translated from the second virtual address. The virtual aliasing cache hit/miss detector further comprises a comparator means. The comparator means is configured to receive the first physical address and the second physical address. The comparator means is further configured to effectuate a generation of an aliased cache hit/miss indicator based on a comparison of the first physical address to the second physical address.

In another embodiment, a method of providing a virtual aliasing cache hit/miss detector for a virtually-indexed virtually-tagged cache (VIVT cache) is provided. The method comprises receiving a first virtual address at a translation lookaside buffer (TLB). The method further comprises receiving a second virtual address at the TLB comprised of a tag of a cache entry resulting from an indexed read into a virtually-indexed virtually-tagged cache (VIVT cache) based on the first virtual address. The method further comprises generating by the TLB a first physical address translated from the first virtual address. The method further comprises generating by the TLB a second physical address translated from the second virtual address. The method further comprises receiving the first physical address and the second physical address at a comparator. The method further comprises effectuating a generation of an aliased cache hit/miss indicator based on a comparison of the first physical address to the second physical address.

In another embodiment, a memory management unit (MMU) is provided. The MMU comprises a virtually-indexed virtually-tagged cache (VIVT cache). The MMU further comprises a virtual aliasing cache hit/miss detector. The virtual aliasing cache hit/miss detector comprises a translation lookaside buffer (TLB). The TLB is configured to receive a first virtual address and a second virtual address comprised of a tag of a cache entry resulting from an indexed read into the VIVT cache based on the first, virtual address. The TLB is further configured to generate a first physical address translated from the first virtual address. The TLB is further configured to generate a second physical address translated from the second virtual address. The virtual aliasing cache hit/miss detector further comprises a comparator. The comparator is configured to receive the first physical address and the second physical address. The comparator is further configured to effectuate a generation of an aliased cache hit/miss indicator based on a comparison of the first physical address to the second physical address.

DETAILED DESCRIPTION

With reference now to the drawing figures, several exemplary embodiments of the present disclosure are described.

The word "exemplary" is used herein to mean "serving as an example, instance, or illustration." Any embodiment described herein as "exemplary" is not necessarily to be construed as preferred or advantageous over other embodiments.

Embodiments disclosed in the detailed description include apparatuses and related systems and methods for determining cache hit/miss of aliased addresses in virtually-tagged cache(s), in this regard in one embodiment, a virtual aliasing cache hit/miss detector for a virtually-indexed virtually-tagged cache (VIVT cache) is provided. The virtual aliasing cache hit/miss detector comprises a translation lookaside buffer (TLB). The TLB is configured to receive a first virtual address and a second virtual address comprised of a tag of a cache entry resulting from an indexed read into a VIVT cache based on the first virtual address. The TLB is further configured to generate a first physical address translated from the first virtual address. The TLB is further configured to generate a second physical address translated from the second virtual address. The virtual aliasing cache hit/miss detector further comprises a comparator. The comparator is configured to receive the first physical address and the second physical address. The comparator is further configured to effectuate a generation of an aliased cache hit/miss indicator based on a comparison of the first physical address to the second physical address.

In this manner, the virtual aliasing cache hit/miss detector correctly generates cache hits and cache misses for the VIVT cache, even in the presence of aliased addressing (i.e., synonyms). By avoiding generating false cache misses in the presence of aliased addressing, the virtual aliasing cache hit/miss detector can avoid performance penalties associated with generating false cache misses and/or data incoherency problems associated with generating false cache misses.

Figure 1:
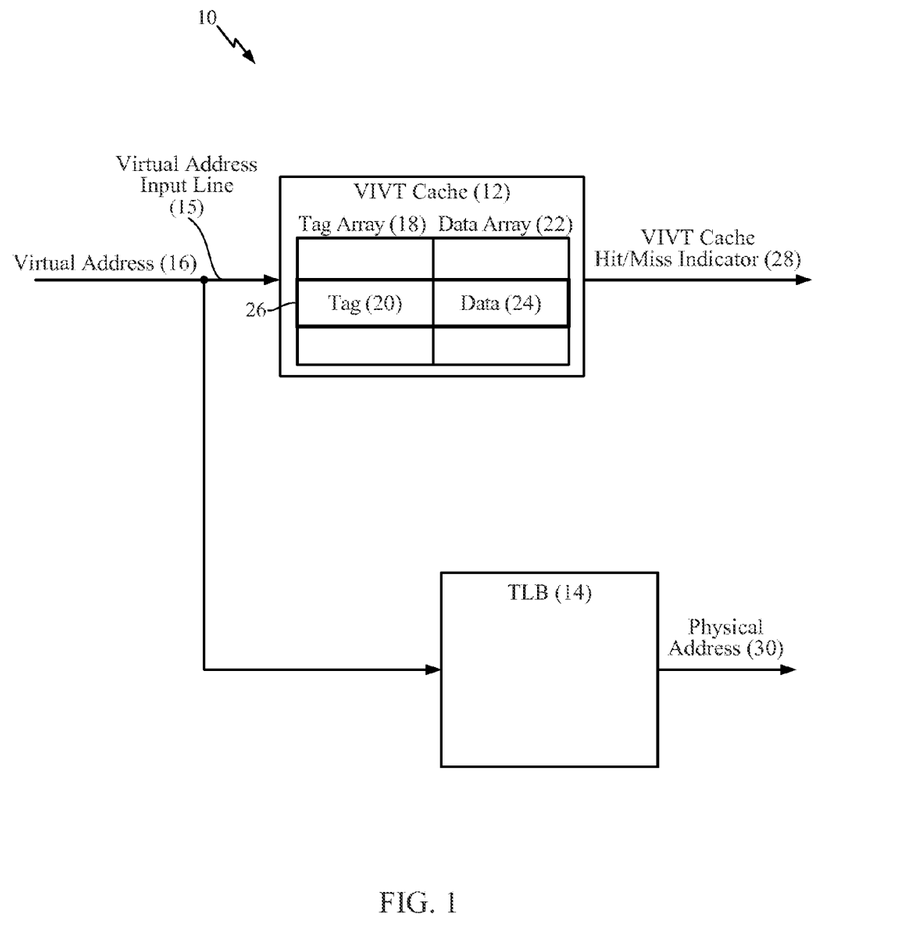
FIG. 1 is a block diagram illustrating an exemplary memory management unit (MMU) employing a virtually-indexed virtually-tagged cache (VIVT cache) and a translation lookaside buffer (TLB)

Before discussing embodiments for determining cache hit/miss of aliased addresses in virtually-tagged cache(s), problems encountered in virtually-indexed virtually-tagged cache(s) in the presence of aliased addressing are first discussed with regard to FIG. 1.

In this regard, FIG. 1 illustrates a memory management unit (MMU) 10 which may generate one or more false cache misses. The MMU 10 employs a virtually-indexed virtually-tagged cache (VIVT cache) 12 and a translation lookaside buffer (TLB) 14. The VIVT cache 12 includes a tag array 18 of tags 20 and a data array 22 of data 24. When a CPU operation is performed involving a virtual address, the virtual address is provided to the VIVT cache 12 over a virtual address input line 15. The VIVT cache 12 uses a virtual address 16 received over virtual address input line 15 to index the tag array 18 to determine if there is a cache entry 26 corresponding to the received virtual address 16. If the indexed tag 20 matches designated portions of the virtual address 16, then data 24 contains a (cached) copy of data for the virtual address 16. The VIVT cache 12 generates a VIVT hit/miss indicator 28 indicating whether a matching cache entry 26 was found for the received virtual address 16. The virtual address input line 15 is also provided as an input to the TLB 14. The TLB 14 translates the received virtual address 16 into a physical address 30. The physical address 30 may be used to access data corresponding to the virtual address 16 in physical memory, for example, when the VIVT cache 12 generates a VIVT cache hit/miss indicator 28 indicating a cache miss.

The MMU 10 in FIG. 1 encounters problems with aliased addresses (i.e., synonyms). Virtual aliased addresses are created when two or more different virtual addresses 16 point to a same physical address 30. Because of virtual aliased addresses, the VIVT cache 12 may generate a cache miss, even when data 24 stored at the physical address 30 corresponding to the virtual address 16 is contained in the VIVT cache 12. In other words, the VIVT cache 12 may report a false miss.

In this regard, consider a scenario where a first virtual address 16 and a second virtual address 16 point to a same physical address 30. After a first operation accesses data 24 of the physical address 30 using the first virtual address 16, a cache entry 26 of the VIVT cache 12 will contain a tag 20 matching the first virtual address 16 and a copy (data 24) of the data residing at the physical address 30. Thereafter, a second operation using the second virtual address 16 to index the VIVT cache 12 will result in a cache miss, because tag 20 corresponding to the second virtual address 16 is not in the VIVT cache 12. In other words, the tag 20 (in the VIVT cache 12) corresponding to the first virtual address 16 does not match the second virtual address 16. However, the data 24 for the physical address 30 corresponding to the second virtual address 16 is contained in the VIVT cache 12 (in an entry corresponding to the first virtual address 16). Thus, the miss generated by the VIVT cache 12 is a false miss. For a read operation, one consequence of this false miss is a performance penalty. Because the VIVT cache 12 reports a miss, the MMU 10 will attempt to access the data from a secondary cache or main memory (having a longer access time). Another consequence of the reported VIVT cache 12 miss for a read operation could also be data incoherency. In the event that the aliased data 24 in the VIVT cache 12 is dirty, the read operation will attempt to access the data from a secondary cache or main memory, both of which have a stale copy of the data.

For a write operation, the consequence of this false miss is data incoherency. Because the VIVT cache 12 generates a false miss, the cache entry 26 in the VIVT cache 12 corresponding to the first virtual address 16 (also corresponding to the same physical address 30 as the second virtual address 16) will not be overwritten with the new data from the write operation. The write operation will cause other memory (e.g., an entry corresponding to the physical address 30 in a secondary cache and/or main memory) to store the new data. However, a subsequent read operation performed on the first virtual address 16 would result in the VIVT cache 12 returning incorrect data (the old data) no longer stored at the corresponding physical address 30.

Figure 2:
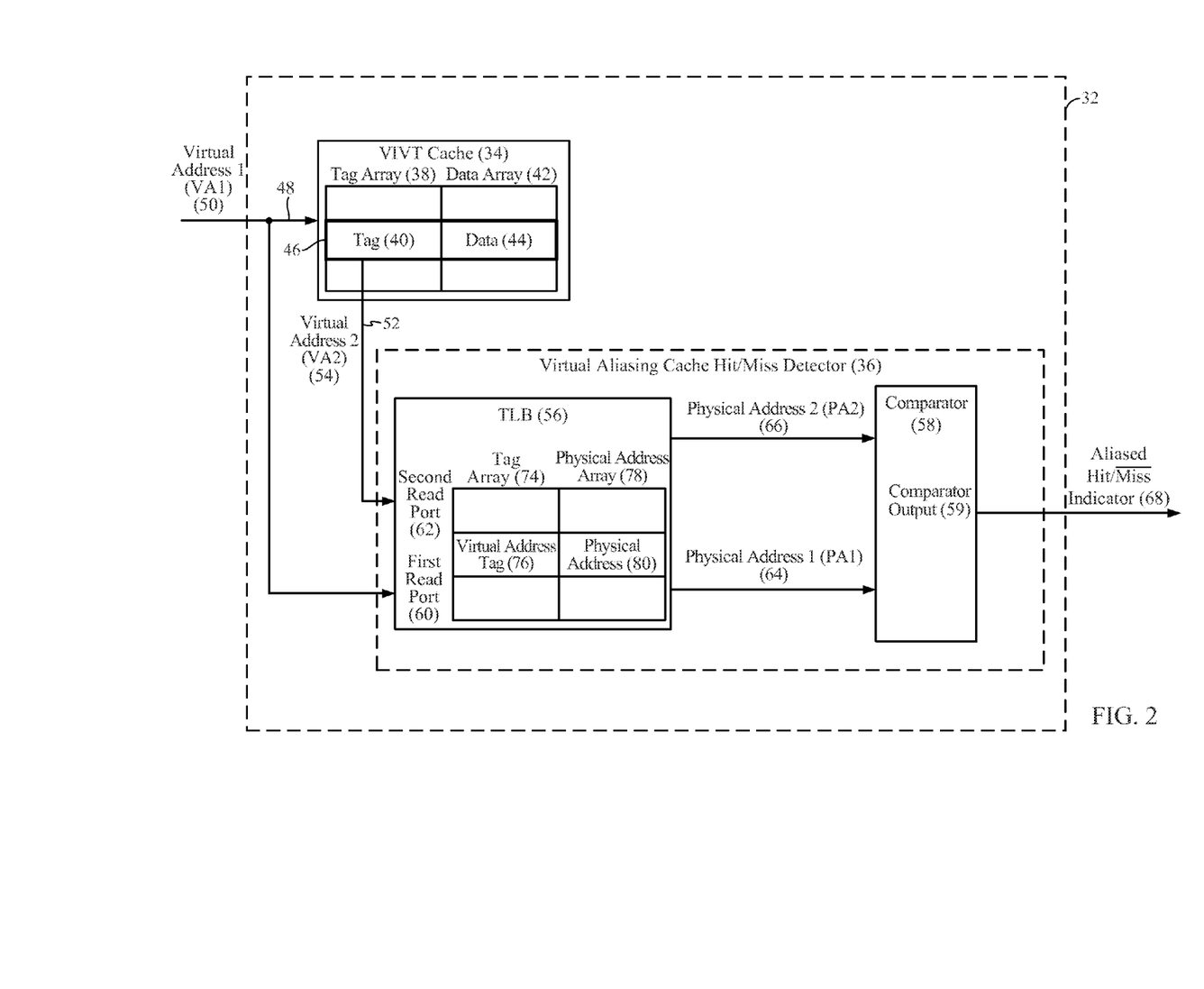
FIG. 2 is a block diagram illustrating an exemplary MMU employing a VIVT cache and a generalized virtual aliasing cache hit/miss detector to determine whether a non-aliased cache miss is an aliased cache hit or an aliased cache miss.

FIG. 2 provides an MMU 32 that includes a virtual aliasing cache hit/miss detector 36 to distinguish between a false VIVT cache miss and a true VIVT cache miss. This may avoid performance penalties and data incoherency problems associated with generating false VIVT cache misses. In this regard, the MMU 32 comprises a virtually-indexed virtually-tagged cache (VIVT cache) 34 and a virtual aliasing cache hit/miss detector 36. The virtual aliasing cache hit/miss detector 36 detects the existence of a cache entry 46 in the VIVT cache 34 for aliased addresses. The virtual aliasing cache hit/miss detector 36 generates an aliased cache hit indication as an aliased cache hit/miss indicator 68 if the cache entry 46 in the VIVT cache 34 exists for either the received virtual address or an aliased address (i.e., a different virtual address translating to the same physical address as the received virtual address). The virtual aliasing cache hit/miss detector 36 generates an aliased cache miss indication as the aliased cache hit/miss indicator 68 if there is no cache entry 46 in the VIVT cache 34 for either the received virtual address or an aliased address. As a result, the MMU 32 generates true cache hits and does not generate false cache misses. Thus, the MMU 32 does not experience the performance penalties and data incoherency problems of MMU 10 (FIG. 1) in the presence of aliased addressing.

With continuing reference to FIG. 2, the MMU 32 is now described in more detail. As previously discussed, the MMU 32 comprises a VIVT cache 34 and a virtual aliasing cache hit/miss detector 36. The VIVT cache 34 comprises a tag array 38 of tags 40 and a data array 42 of data 44. The VIVT cache 34 receives as input a virtual address input line 48 on which the VIVT cache 34 receives a first virtual address (VA1) 50 as a result of an operation. The VIVT cache 34 first indexes the tag array 38 based on the first virtual address 50 to determine if a cache entry 46 exists corresponding to the received first virtual address 50. If the indexed tag 40 matches the first virtual address 50 (or designated portions), the data 44 corresponding to the cache entry 46 contains data for the first virtual address 50 (i.e., a non-aliased cache hit). In this instance, the VIVT cache 34 generates a cache hit, because the data 44 of that cache entry 46 contains the data residing at a first physical address 64 to which the first virtual address 50 maps.

With continuing reference to FIG. 2, if however, the indexed tag 40 in the VIVT cache 34 does not match the first virtual address 50 (or designated portions), a non-aliased cache miss is generated by the VIVT cache 34. However, it is not known whether the data 44 corresponding to the indexed tag 40 in the VIVT cache 34 is contained at the physical address to which the first virtual address 50 maps. Thus, the cache miss generated by the VIVT cache 34 may be a false cache miss or a true cache miss. In this embodiment, to determine whether the cache miss generated by the VIVT cache 34 is a false cache miss or a true cache miss, the physical address 64 to which the first virtual address 50 maps is compared to the physical address 66 to which the indexed tag 40 maps (i.e., the physical address 66 to which a second virtual address 54 maps). If these physical addresses 64, 66 match, the data 44 corresponding to the indexed tag 40 in the VIVT cache 34 is data contained at the physical address 64 to which the first virtual address 50 is mapped. Thus, the cache miss generated by the VIVT cache 34 is a false cache miss.

In this regard, FIG. 2 illustrates the virtual aliasing cache hit/miss detector 36 employing a modified translation lookaside buffer (TLB) 56 configured to translate the first virtual addresses 50 and a second virtual address 54 from the indexed tag 40 into their corresponding first and second physical addresses 64, 66. The TLB 56 provided in this embodiment is configured to receive the first virtual address 50 from the VIVT cache 34 on a first read port 60. The TLB 56 is also configured to receive the second virtual address 54 based on the indexed tag 40 in the VIVT cache 34 on a second read port 62. The TLB 56 translates the first virtual address 50 to its corresponding first physical address 64. The TLB 56 also translates the second virtual address 54 to its corresponding second physical address 66. If the first physical address 64 and the second physical address 66 are the same, the second virtual address 54 is an alias of the first virtual address 50, and the cache miss generated by the VIVT cache 34 was a false cache miss (i.e., an aliased cache hit). If the first physical address 64 and the second physical address 66 are not the same, then the second virtual address 54 is not an alias of the first virtual address 50, and the cache miss generated by the VIVT cache 34 was a true cache miss (i.e., an aliased cache miss). As a result, the MMU 32 in FIG. 2 is configured to correctly generate true cache hits and not generate false cache misses. Thus, the MMU 32 does not experience the performance penalties and data incoherency problems of the MMU 10 in FIG. 1 in the presence of aliased addressing.

The aliased hit/miss indicator 68 is externally provided by the MMU 32 instead of a non-aliased cache hit/miss indicator generated by the VIVT cache 34 (such as the VIVT cache hit/miss indicator 28 in FIG. 1). This is advantageous because the aliased hit/miss indicator 68 does not generate false cache misses. Thus, as illustrated in FIG. 2, a non-aliased hit/miss indicator (such as the VIVT cache hit/miss indicator 28 in FIG. 1) may also not have to be externally provided from the VIVT cache 34. However, in some embodiments, the VIVT cache 34 may also externally provide a non-aliased hit/miss indicator.

As illustrated in FIG. 2, the TLB 56 comprises a tag array 74 of virtual address tags 76 and a physical address array 78 of physical addresses 80. The TLB 56 indexes tag array 74 by the received first virtual address 50 to determine the first physical address 64 to which the first virtual address 50 translates. The TLB 56 also indexes tag array 74 by the received second virtual address 54 to determine the second physical address 66 to which the second virtual address 54 translates. A virtual aliasing cache hit/miss detector 36 employing a comparator 58 is provided to receive and compare the first physical address 64 to the second physical address 66. The first physical address 64 and the second physical address 66 are compared to determine if an aliased cache hit (i.e., a false cache miss/true cache hit) or aliased cache miss (i.e., a true cache miss) has occurred. The comparator 58 is configured to effectuate a generation of an aliased cache hit/miss indicator 68 based on a comparison of the first physical address 64 to the second physical address 66.

In this embodiment, the comparator 58 is configured to effectuate a generation of an aliased cache hit/miss indicator 68 by directly providing the aliased cache hit/miss indicator 68. In other words, the aliased cache hit/miss indicator 68 can be provided to additional circuitry to indicate whether the cache miss generated by the VIVT cache 34 was an aliased cache hit or aliased cache miss. However, in other embodiments described below with reference to FIGS. 3 and 4, the comparator 58 may effectuate the determination of an aliased cache hit or aliased cache miss by the aliased cache hit/miss indicator being configured to provide a preliminary aliased cache hit/miss indicator. The preliminary aliased cache hit/miss indicator is provided to additional logic relevant to whether an aliased cache hit can be determined to have occurred.

Figure 3:
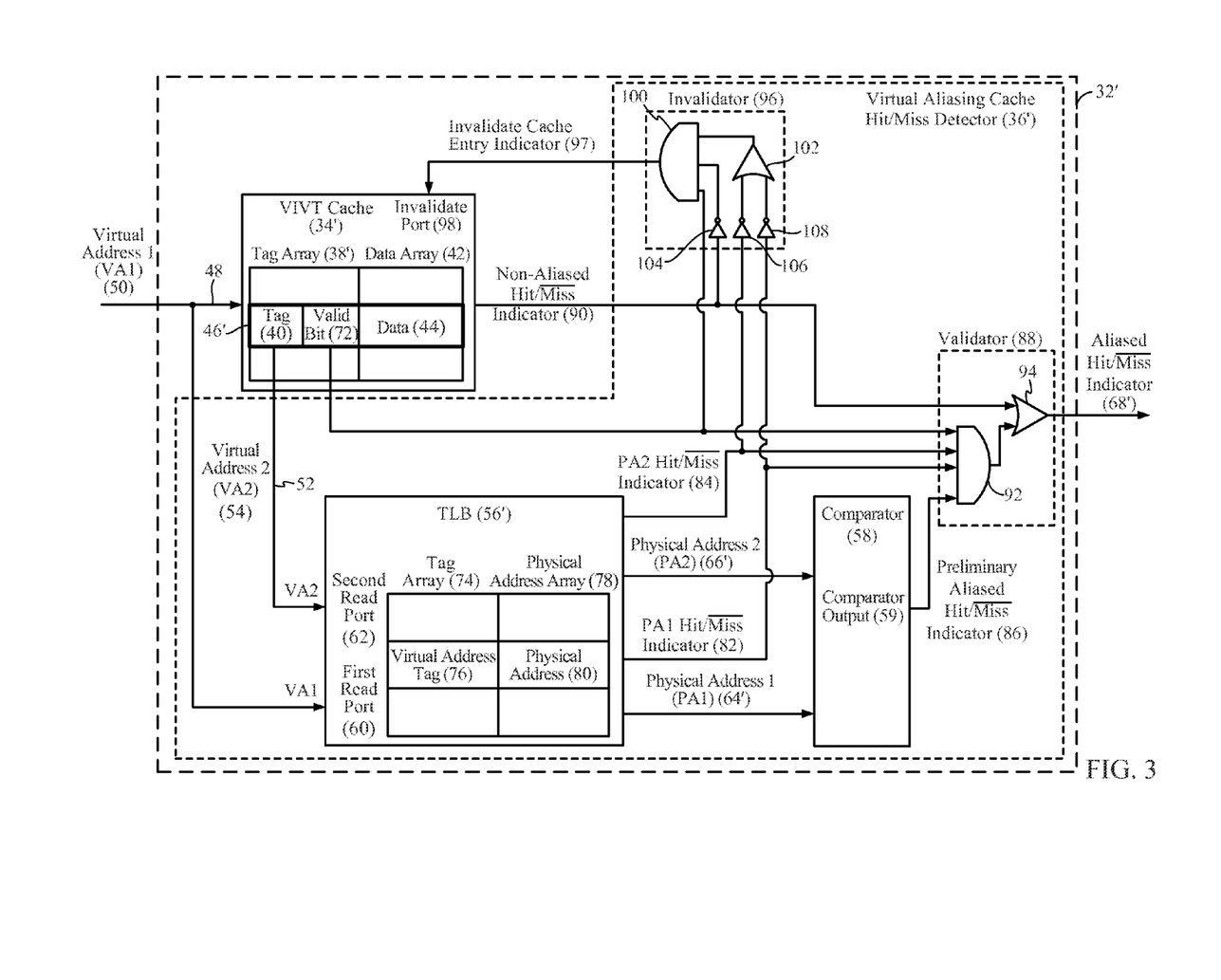
FIG. 3 is a block diagram illustrating an exemplary implementation of the MMU in FIG. 2, employing an embodiment of the virtual aliasing cache hit/miss detector.

FIG. 3 is a block diagram of another exemplary embodiment of a MMU 32' that is similar to the MMU 32 in FIG. 2. Elements with the same element numbers in FIG. 2 have the same or similar functionality to the elements in FIG. 2, and thus will not be re-described. In the MMU 32' in FIG. 3, the cache entries 46' of a VIVT cache 34' contain a valid bit 72 indicative of the validity of data 44 in the cache entry 46'. In the MMU 32' in FIG. 3, each cache entry 46' of the VIVT cache 34' contains a valid bit 72 indicative of the validity of data 44 in the cache entry 46'. If the indexed cache entry 46' is marked invalid (as a non-limiting example, the valid bit 72 is marked 'invalid' or '0'), there cannot be a cache hit (aliased or non-aliased), because the indexed cache entry 46' does not contain valid data 44. Thus, if the indexed cache entry 46' is marked invalid, the aliased cache hit/miss indicator 68' should indicate an aliased cache miss.

In this regard, FIG. 3 provides a validator 88 for validating a preliminary aliased cache hit/miss indicator 86 generated by comparator 58 to provide an aliased cache hit/miss indicator 68'. The preliminary aliased cache hit/miss indicator 86 is preliminary, because further validation of the validity of the data 44 is required in this embodiment to provide the aliased cache hit/miss indicator 68'. To provide for the aliased cache hit/miss indicator 68' to generate an aliased cache miss when the valid bit 72 is marked invalid, the validator 88 comprises AND-based logic for the valid bit 72 and the preliminary aliased cache hit/miss indicator 86 to provide the aliased cache hit/miss indicator 68'. Accordingly, if the valid bit 72 indicated the data 44 is invalid, the validator 88 will generate an aliased cache miss as the aliased cache hit/miss indicator 68'. In one embodiment, the validator 88 may be provided as a two-input AND or NAND gate receiving the valid bit 72 and the preliminary aliased cache hit/miss indicator 86 to generate the aliased cache hit/miss indicator 68'. However, in other embodiments, other validation components, circuitry, and/or logic may be provided in the validator 88 to validate the preliminary aliased cache hit/miss indicator 86 to provide the aliased cache hit/miss indicator 68'.

With continuing reference to FIG. 3, in this embodiment of the MMU 32', the TLB 56' may not contain virtual-to-physical address translation entries for all virtual addresses provided to the MMU 32'. The TLB 56' in FIG. 3 may be a "micro-TLB" or a "shadow TLB." In such embodiments, additional components, circuitry, and/or logic may be provided in the virtual aliasing cache hit/miss detector 36' in the event that a physical address for either the first virtual address 50 and/or the second virtual address 54 is not available in the TLB 56'. If either of the first and second physical addresses 64', 66' corresponding to the first and second virtual addresses 50, 54 are not present in the TLB 56', a valid comparison of the first and second physical addresses 64', 66' cannot be made by the comparator 58. Thus, the virtual aliasing cache hit/miss detector 36' cannot determine if the non-aliased cache miss generated by the VIVT cache 34' is a true cache hit (i.e., an aliased cache hit) or a true cache miss (i.e., an aliased cache miss).

In this regard, the MMU 32', and more particularly the validator 88, contains additional logic to avoid generating a true cache hit (i.e., an aliased cache hit) when at least one of the first and second physical addresses 64', 66' corresponding to the first and second virtual addresses 50, 54 are not present in the TLB 56'. In this regard, TLB 56' generates a first physical address hit/miss indicator 82 and a second physical address hit/miss indicator 84. If a matching TLB entry is contained in the TLB 56' for translating the first virtual address 50 to a first physical address 64', the TLB 56' generates a physical address hit indication on the first physical address hit/miss indicator 82. If a matching TLB entry is not contained in the TLB 56' for translating the first virtual address 50 to a first physical address 64', the TLB 56' generates a physical address miss indication on the first physical address hit/miss indicator 82. On such a miss, the first physical address 64' may be zero or undefined.

Similarly, if a matching TLB entry is contained in the TLB 56' for translating the second virtual address 54 to a second physical address 66', the TLB 56' generates a physical address hit indication on the second physical address hit/miss indicator 84. If a matching TLB entry is not contained in the TLB 56' for translating the second virtual address 54 to a second physical address 66', the TLB 56' generates a physical address miss indication on the second physical address hit/miss indicator 84. On such a miss, the second physical address 66' may be zero or undefined.

If a physical address miss indication is generated on the first physical address hit/miss indicator 82 and/or the second physical address hit/miss indicator 84, it cannot be determined whether the second virtual address 54 is an alias of the first virtual address 50. In this scenario, unless the first virtual address 50 directly matches the tag 40 of the indexed cache entry 46' (i.e., there is a non-aliased cache hit), then the aliased cache hit/miss indicator 68' is generated as a cache miss.

In this regard, the validator 88 comprises AND-based logic 92 and OR-based logic 94. The AND-based logic 92 receives the first physical address hit/miss indicator 82, the second physical address hit/miss indicator 84, and the preliminary aliased cache hit/miss indicator 86 and generates an output to the OR-based logic 94. The OR-based logic 94 receives a non-aliased cache hit/miss indicator 90 and the output of the AND-based logic 92. The OR-based logic 94 also generates the aliased cache hit/miss indicator 68'. Thus, if a physical address miss indication is generated on the first or second physical address hit/miss indicator 82, 84 (or both), then the aliased cache hit/miss indicator 68' will be provided as a cache miss, unless the first virtual address 50 directly matches the tag 40 of the indexed cache entry 46' (i.e., unless the non-aliased cache hit/miss indicator 90 is a non-aliased cache hit). The AND-based logic 92 in this embodiment also receives an indication of validity of the entry 46' corresponding to the tag 40 (e.g., the valid bit 72), such that the validator 88 can generate an aliased cache miss as the aliased cache hit/miss indicator 68' if the data 44 is invalid or the TLB 56' does not contain physical addresses for either of the first and second virtual addresses 50, 54.

The MMU 32' in FIG. 3 is also configured to address another issue caused by the TLB 56'. The MMU 32' in FIG. 3 also contains an invalidator 96 providing an invalidate cache entry indicator 97 to an invalidate port 98 of the VIVT cache 34' for invalidating the currently indexed cache entry 46' of the VIVT cache 34'. This embodiment avoids data incoherency problems when the TLB 56' is unable to provide a first and/or second physical address 64', 66' translation for either the first virtual address 50 and/or the second virtual address 54 or the entry 46' corresponding to the tag 40 is invalid. In this regard, in this embodiment, the invalidator 96 contains OR-based logic 102 for invalidating the currently indexed cache entry 46' when either the first physical address hit/miss indicator 82 and/or the second physical address hit/miss indicator 84 is provided as a physical address miss indication. In one embodiment, OR-based logic 102 is provided as a two-input OR gate receiving the first physical address hit/miss indicator 82 and the second physical address hit/miss indicator 84 and directly generating the invalidate cache entry indicator 97 to the invalidate port 98 of the VIVT cache 34'. However, as illustrated in FIG. 3, additional logic may also be provided in the invalidator 96 to avoid unnecessarily invalidating the currently indexed cache entry 46'.

With continuing reference to the invalidator 96 in FIG. 3, if the first virtual address 50 directly matches the tag 40 of the currently indexed cache entry 46' (i.e., there is a non-aliased cache hit), then the aliased cache hit/miss indicator 68' should be a cache hit regardless of whether the TLB 56' can translate the first and second virtual addresses 50, 54 to the first and second physical addresses 64', 66'. In this scenario, the non-aliased cache hit/miss indicator 90 will be generated by the VIVT cache 34' as a non-aliased cache hit. Accordingly, the invalidator 96 provides AND-based logic 100 preventing the invalidator 96 from invalidating the currently indexed cache entry 46' of the VIVT cache 34' if non-aliased cache hit/miss indicator 90 is a non-aliased cache hit.

The invalidator 96 in FIG. 3 also provides an additional optimization for avoiding unnecessarily invalidating the currently indexed cache entry 46'. If the currently indexed cache entry 46' is already marked invalid, then there is no need to invalidate that cache entry 46'. In this regard, invalidator 96 provides AND-based logic 100 preventing the invalidator 96 from invalidating the currently indexed cache entry 46' if the valid bit 72 of the currently indexed cache entry 46' is already marked invalid.

As illustrated in FIG. 3, the invalidator 96 may be provided using OR-based logic 102 and/or AND-based logic 100. In one embodiment, the invalidator 96 may be provided by an OR gate, an AND gate, and inverters 104, 106, and 108. However, one of ordinary skill in the art will appreciate that alternative logic gates may also be used (as non-limiting examples, OR gates, AND gates, NAND gates, NOR gates, inverters, and/or other gates) to provide the invalidator 96. One of ordinary skill in the art will also appreciate other hardware or software that may be used to provide the invalidator 96. Furthermore, depending on the specific implementation, additional inputs, fewer inputs, or alternative inputs may be used to provide the invalidator 96 for invalidating the currently indexed cache entry 46' of the VIVT cache 34'. Furthermore, the invalidator 96 is an optional component of the virtual aliasing cache hit/miss detector 36' in some embodiments. For example, an invalidator 96 may not be provided in a virtual aliasing cache hit/miss detector 36" which assures that the first and second virtual addresses 50, 54 can be translated to first and second physical addresses 64", 66". In this regard, FIG. 4 provides an embodiment which may not require an invalidator 96 because translation of the first and second virtual addresses 50, 54 to the first and second physical addresses 64", 66" is assured by additional components, circuitry, and/or logic.

Figure 4:
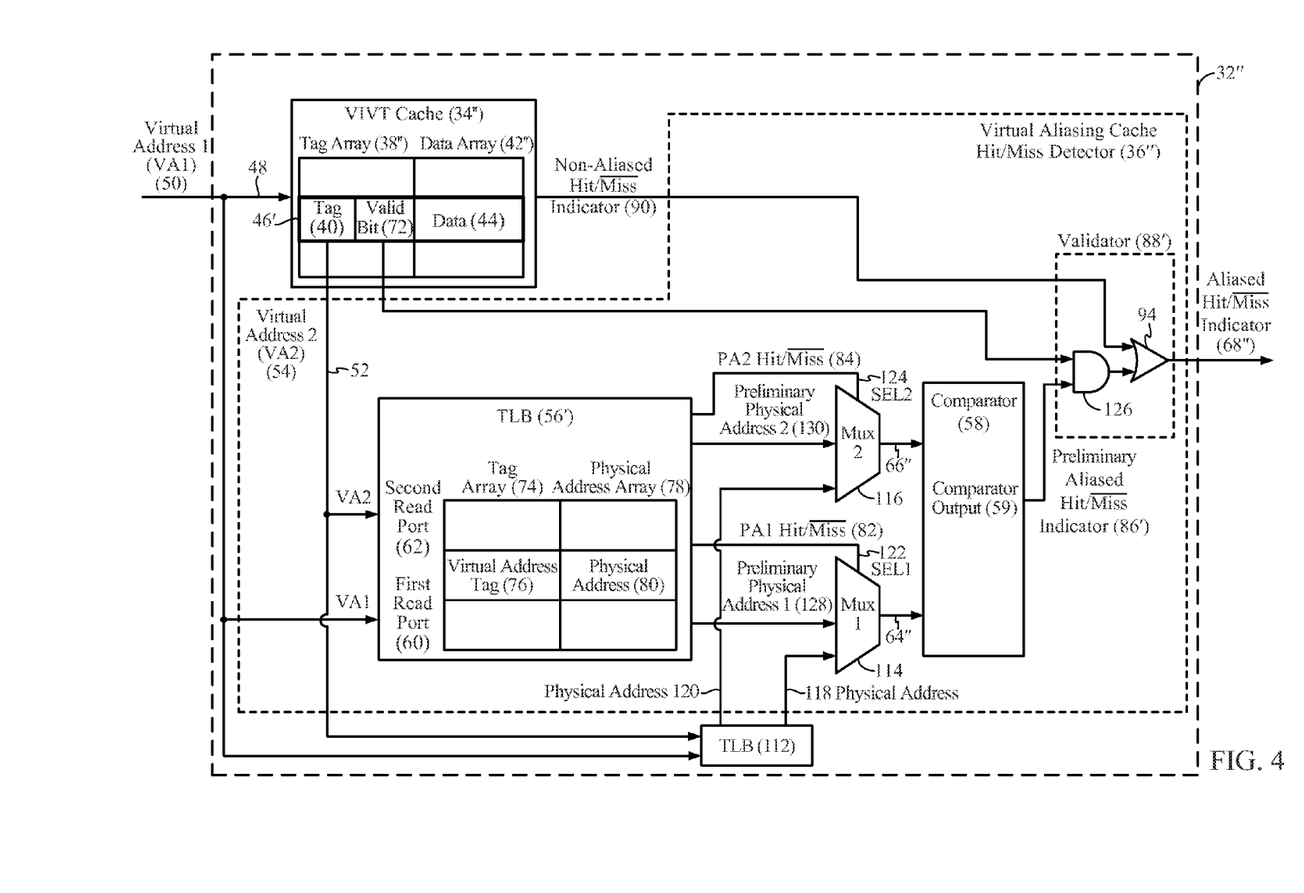
FIG. 4 is a block diagram illustrating another exemplary implementation of the MMU in FIG. 2 employing an additional translation lookaside buffer providing an alternative source of virtual-to-physical address translation.

FIG. 4 illustrates another exemplary MMU 32" providing an exemplary embodiment of the MMU 32 in FIG. 2. The MMU 32" in FIG. 4 provides additional circuitry to provide an alternative source of virtual-to-physical address translation if the first virtual address 50 and/or the second virtual address 54 is not contained in the TLB 56'. In this regard, the MMU 32" in FIG. 4 comprises an additional TLB 112 to provide an alternative source of virtual-to-physical address translation. The TLB 112 receives the first virtual address 50 and translates it to a third physical address (PA3) 118. The TLB 112 further receives the second virtual address 54 and translates it to a fourth physical address (PA4) 120. The TLB 112 may be able to translate all virtual addresses accessible by the MMU 32" to physical addresses. As a result, translation of the first and second virtual addresses 50, 54 to the first and second physical addresses 64", 66" may be assured. However, the TLB 112 may utilize more time than the TLB 56' to perform its virtual-to-physical address translation. The TLB 112 may be a unified TLB (i.e., a TLB providing virtual-to-physical address translations for both instructions and data).

With continuing reference to FIG. 4, the virtual aliasing cache hit/miss detector 36" further comprises a first multiplexer (MUX1) 114 and a second multiplexer (MUX2) 116 for selecting among the translated addresses provided by the TLB 56' and the TLB 112. If the TLB 56' contains virtual-to-physical address translation entries for the first and/or second virtual addresses 50, 54, then the first and second preliminary physical addresses 128, 130 provided by the TLB 56" may be provided by the first and second multiplexers 114, 116 as the first and second physical addresses 64", 66". Otherwise, third and fourth physical addresses 118, 120 from the TLB 112 may be provided as the first and second physical addresses 64", 66".

In this regard, the first multiplexer 114 receives a first preliminary physical address 128 generated by the TLB 56' and the third physical address 118 generated by the TLB 112. The first multiplexer 114 also receives a first select input (SEL1) 122. The first select input 122 provided to the first multiplexer 114 may be based on the first physical address hit/miss indicator 82 generated by the TLB 56'. In one embodiment, as illustrated in FIG. 4, the first physical address hit/miss indicator 82 generated by the TLB 56' may be provided to the first multiplexer 114 as the first select input 122. When the first physical address hit/miss indicator 82 is a hit, the first multiplexer 114 will provide the first preliminary physical address 128 generated by the TLB 56' as the first physical address 64" provided to the comparator 58. In this instance, the first physical address 64" may be provided to the comparator 58 without waiting for the TLB 112 to provide a translated third physical address 118. However, when the first physical address hit/miss indicator 82 is a miss, the first multiplexer 114 will provide the third physical address 118 generated by the TLB 112 as the first physical address 64" provided to the comparator 58. One of ordinary skill in the art will appreciate that alternative logic based on the first physical address hit/miss indicator 82 may also be provided to the first multiplexer 114 as the first select input 122.

Similarly, the second multiplexer 116 receives a second preliminary physical address 130 generated by the TLB 56' and the fourth physical address 120 generated by the TLB 112. The second multiplexer 116 also receives a second select input (SEL2) 124. The second select input 124 provided to the second multiplexer 116 may be based on the second physical address hit/miss indicator 84 generated by the TLB 56'. In one embodiment, as illustrated in FIG. 4, the second physical address hit/miss indicator 84 generated by the TLB 56' may be provided to the second multiplexer 116 as the second select input 124. However, one of ordinary skill in the art will appreciate that alternative logic based on the second physical address hit/miss indicator 84 may also be provided to the second multiplexer 116 as the second select input 124. When the second physical address hit/miss indicator 84 is a hit, the second multiplexer 116 will provide the second preliminary physical address 130 generated by the TLB 56' as the second physical address 66" provided to the comparator 58. In this instance, the second physical address 66" may be provided to the comparator 58 without waiting for the TLB 112 to provide a translated fourth physical address 120. However, when the second physical address hit/miss indicator 84 is a miss, the second multiplexer 116 will provide the fourth physical address 120 generated by the TLB 112 as the second physical address 66" provided to the comparator 58.

When the first and/or second physical address hit/miss indicator 82, 84 is a miss, a processing pipeline in which the MMU 32" may be provided may be stalled until the TLB 112 provides the third and/or fourth physical address 118, 120. Though the processing pipeline may be stalled, it is assured that regardless of whether the TLB 56' contains an entry for the first and/or second virtual address 50, 54, the first and second physical addresses 64", 66" will be properly translated. As a result, the MMU 32" does not require an invalidator (such as the invalidator 96 in FIG. 3) for invalidating the current cache entry 46' due to translation misses of the TLB 56'.

Because a properly translated first physical address 64" and second physical address 66" are assured, the validator 88' may also be provided using reduced logic. In FIG. 4, the validator 88' does not need to handle cases where virtual-to-physical address translations in the TLB 56' miss (in contrast to the embodiment provided in FIG. 3). In this regard, as illustrated in FIG. 4, the first and second physical address hit/miss indicators 82, 84 may not be provided as inputs to validator 88' in MMU 32".

A hybrid approach combining certain elements of FIGS. 3 and 4 is also possible. In this regard in one embodiment, the first physical address 64" may be provided translation from either the TLB 56' or the TLB 112 (as illustrated in FIG. 4), whereas the second physical address 66' may only be provided translation from the TLB 56' (as illustrated in FIG. 3). Accordingly, a first multiplexer (MUX1) 114 would be provided for receiving the translation from either the TLB 56' or the TLB 112 to provide the first physical address 64" to the comparator 58. However, the second multiplexer (MUX2) 116 would not be required to provide the second physical address 66' to the comparator 58. Instead, the comparator 58 may be configured to receive the second preliminary physical address 130 generated by the TLB 56' as the second physical address 66'. A validator 88 would receive the second physical address hit/miss indicator 84 as illustrated in FIG. 3. The validator 88 may not be required to receive the first physical address hit/miss indicator 82. If the TLB 112 is able to translate all virtual addresses accessible by the MMU 32" to physical addresses, the translation of the first physical address 64" would be assured. An invalidator 96 would also be provided. AND-based logic 100 of the invalidator 96 would receive the inverted second physical address hit/miss indicator 84. However, the invalidator 96 would not be required to receive the first physical address hit/miss indicator 82 if TLB 112 assures the translation of the first physical address 64".

As illustrated in FIGS. 3 and 4, the validator 88, 88' and the invalidator 96 may be comprised of AND-based logic. One of ordinary skill in the art will appreciate that various logic gates may also be used (as non-limiting examples, AND gates, OR gates, NAND gates, NOR gates, inverters, and/or other gates) to provide the validator 88, 88' and/or invalidator 96. One of ordinary skill in the art will also appreciate other hardware or software that may be used to provide the validator 88, 88' and/or the invalidator 96. Furthermore, depending on the specific implementation, additional inputs, fewer inputs, or alternative inputs may be used to provide the validator 88, 88' for validating the preliminary aliased cache hit/miss indicator 86, 86' generated by the comparator 58, A virtual aliasing cache hit/miss detector 36, 36', 36", and/or an MMU(s) 32, 32', 32" comprising a virtual aliasing cache hit/miss detector 36, 36', 36", and related systems and methods according to embodiments disclosed herein may be provided in or integrated into any processor-based device. Examples, without limitation, include a set top box, an entertainment unit, a navigation device, a communications device, a fixed location data unit, a mobile location data unit, a mobile phone, a cellular phone, a computer, a portable computer, a desktop computer, a personal digital assistant (PDA), a monitor, a computer monitor, a television, a tuner, a radio, a satellite radio, a music player, a digital music player, a portable music player, a digital video player, a video player, a digital video disc (DVD) player, and a portable digital video player.

Figure 5:
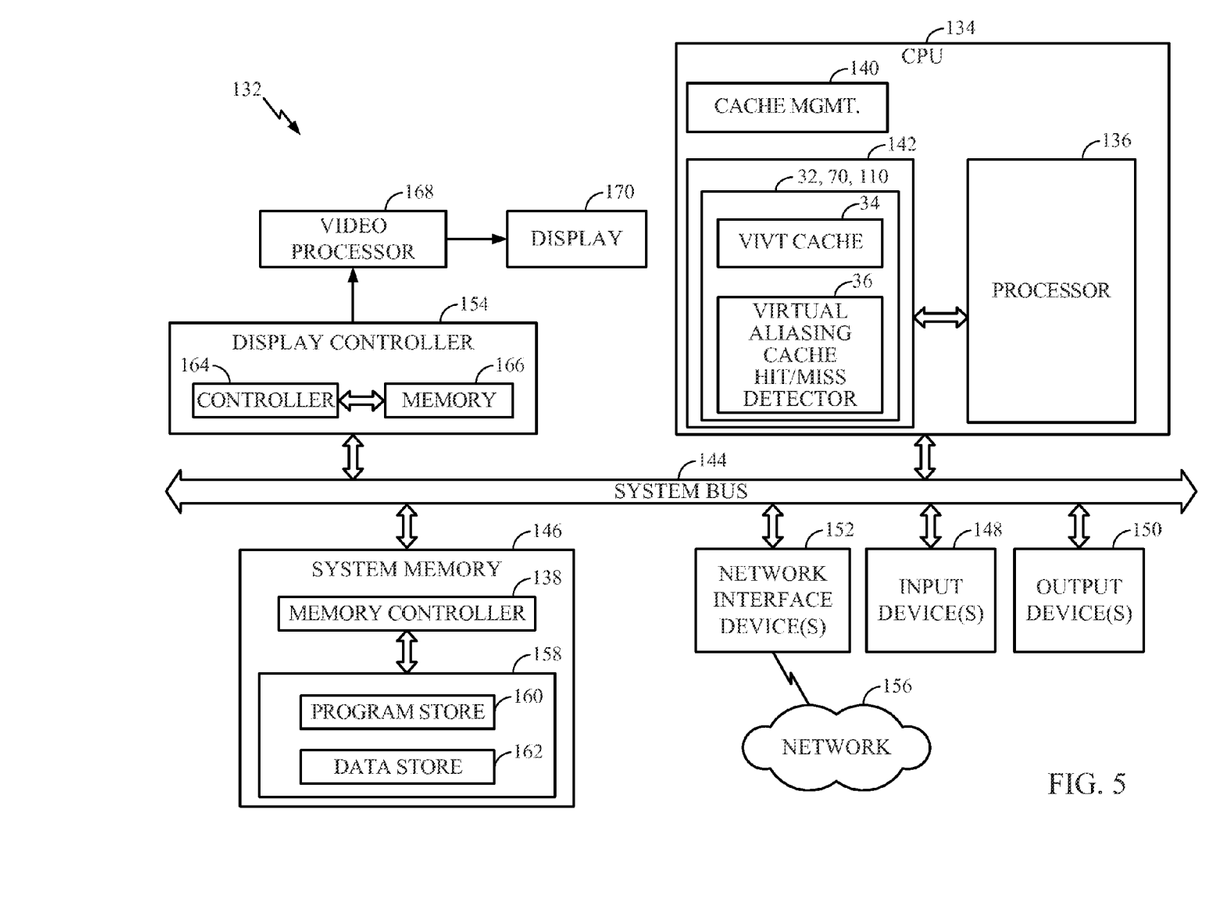
FIG. 5 is a block diagram of an exemplary processor-based system that includes an MMU employing a VIVT cache and a virtual aliasing cache hit/miss detector to determine if a cache miss is an aliased cache hit or aliased cache miss to accommodate virtual aliased addresses.

In this regard, FIG. 5 illustrates an example of a processor-based system 132 that can employ the virtual aliasing cache hit/miss detectors 36, 36', 36" and/or the MMUs 32, 32', 32" comprising the virtual aliasing hit/miss detectors 36, 36', 36" illustrated in FIGS. 2, 3, and/or 4. In this example, the processor-based system 132 includes one or more central processing units (CPUs) 134, each including one or more processors 136. The CPU(s) 134 may be a master device. The CPU(s) 134 may have cache memory 142 coupled to the processor(s) 136 for rapid access to temporarily stored data. Cache memory 142 may comprise the MMU(s) 32, 32', 32", the VIVT cache(s) 34, 34', 34" and/or the virtual aliasing cache hit/miss detector(s) 36, 36', 36". Cache memory 142 may be managed by a cache management unit 140. The CPU(s) 134 is coupled to a system bus 144 and can inter-couple master devices and slave devices included in the processor-based system 132. As is well known, the CPU(s) 134 communicates with these other devices by exchanging address, control, and data information over the system bus 144. For example, the CPU(s) 134 can communicate bus transaction requests to a memory controller 138 to access memory 158 of a system memory 146. Memory 158 of system memory 146 may comprise program store 160 and/or data store 162. Although not illustrated in FIG. 5, multiple system buses 144 could be provided, wherein each system bus 144 constitutes a different fabric.

Other master and slave devices can be connected to the system bus 144. As illustrated in FIG. 5, these devices can include a system memory 146, one or more input devices 148, one or more output devices 150, one or more network interface devices 152, and one or more display controllers 154, as examples. The input device(s) 148 can include any type of input device, including but not limited to input keys, switches, voice processors, etc. The output device(s) 150 can include any type of output device, including but not limited to audio, video, other visual indicators, etc. The network interface device(s) 152 can be any devices configured to allow exchange of data to and from a network 156. The network 156 can be any type of network, including but not limited to a wired or wireless network, private or public network, a local area network (LAN), a wide local area network (WLAN), and the Internet. The network interface device(s) 152 can be configured to support any type of communication protocol desired. Cache memory 142 can include one or more MMUs 32, 32', 32''.

The CPU(s) 134 may also be configured to access the display controller(s) 154 over the system bus 144 to control information sent to one or more displays 170. The display controller(s) 154 sends information to the display(s) 170 to be displayed via one or more video processors 168, which process the information to be displayed into a format suitable for the display(s) 170. The display(s) 170 can include any type of display, including but not limited to a cathode ray tube (CRT), a liquid crystal display (LCD), a light emitting diode (LED) display, a plasma display, a two dimensional (2-D) display, a three dimensional (3-D) display, a touch-screen display, etc.

The CPU(s) 131 and the display controller(s) 154 may act as master devices to make memory access requests to memories 158, 166 over the system bus 144. Different threads within the CPU(s) 134 and the display controller(s) 154 may make requests to access memory in CPU(s) 134 (as a non-limiting example, general purpose registers in CPU(s) 134) and/or to memory controllers 138, 164. Such memory may be cached in the MMU(s) 32, 32', 32'', for example, in the VIVT cache(s) 34. If not cached in the MMU(s) 32, 32', 32'', such memory may be accessed from general purpose registers in CPU(s) 134 and/or memories 158, 166. Any memory in the processor-based system 132, including memory 158, 166 may be cached using an MMU 32, 32', 32'' comprising a VIVT cache 34, 34', 34'' and a virtual aliasing cache hit/miss detector 36, 36', 36'' according to the apparatuses and methods disclosed herein. As a non-limiting example, any processor, including processors 136, 168 may use an MMU 32, 32', 32'' comprising a VIVT cache 34 and a virtual aliasing cache hit/miss detector 36, 36', 36'' as local cache.

Those of ordinary skill in the art would further appreciate that the various illustrative logical blocks, modules, circuits, and algorithms described in connection with the embodiments disclosed herein may be implemented as electronic hardware, instructions stored in memory or in another computer-readable medium and executed by a processor or other processing device, or combinations of both. The memories, memory banks, memory sub-banks, memory access interfaces (MAIs), memory controllers, buses, master devices, and slave devices described herein may be employed in any circuit, hardware component, integrated circuit (IC), or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends upon the particular application, design choices, and/or design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a processor, a digital signal processor (DSP), an Application Specific Integrated Circuit (ASIC), an Field Programmable Gate Array (FPGA) or other programmable logic device, discrete gate or transistor logic, discrete hardware components, or any combination thereof designed to perform the functions described herein. A processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The embodiments disclosed herein may be embodied in hardware and in instructions that are stored in hardware, and may reside, for example, in Random Access Memory (RAM), flash memory, Read Only Memory (ROM), Electrically Programmable ROM (EPROM), Electrically Erasable Programmable ROM (EEPROM), registers, a hard disk, a removable disk, a CD-ROM, or any other form of computer-readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary embodiments herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary embodiments may be combined. It is to be understood that the operational steps illustrated in the flow chart diagrams may be subject to numerous different modifications as will be readily apparent to one of ordinary skill the art. Those of ordinary skill in the art would also understand that information and signals may be represented using any of a variety of different technologies and techniques. For example, data, instructions, commands, information, signals, bits, symbols, and chips that may be referenced throughout the preceding description may be represented by voltages, currents, electromagnetic waves, magnetic fields or particles, optical fields or particles, or any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but is to be accorded the widest scope consistent with the principles and novel features disclosed herein.

What is claimed is:

1. A virtual aliasing cache hit/miss detector for a virtually-indexed virtually-tagged cache (VIVT cache), comprising:
   a translation lookaside buffer (TLB) configured to:
      receive a first virtual address;
      receive a second virtual address comprised of a tag of a cache entry resulting from an indexed read into the virtually-indexed virtually-tagged cache (VIVT cache) based on the first virtual address, responsive to the tag indicating that the second virtual address is different from the first virtual address;
      generate a first physical address translated from the first virtual address;
      generate a second physical address translated from the second virtual address;
      generate a first physical address hit/miss indicator indicative of whether the first physical address corresponding to the first virtual address is contained in the TLB; and
   generate a second physical address hit/miss indicator indicative of whether the second physical address corresponding to the second virtual address is contained in the TLB;
   a comparator configured to:
      receive the first physical address and the second physical address; and
      effectuate a generation of an aliased cache hit/miss indicator based on a comparison of the first physical address to the second physical address; and
      generate a preliminary aliased cache hit/miss indicator indicative of whether the first physical address equals the second physical address; and
   a VIVT cache entry invalidator configured to:
      receive a non-aliased VIVT cache hit/miss indicator generated by the VIVT cache;
      receive the first physical address hit/miss indicator;
      receive the second physical address hit/miss indicator; and
      generate an invalidation indicator indicative of whether to invalidate the cache entry based on the non-aliased VIVT cache hit/miss indicator, the first physical address hit/miss indicator, and the second physical address hit/miss indicator.

2. The virtual aliasing cache hit/miss detector of claim 1, wherein the comparator is configured to generate an aliased cache hit as the aliased cache hit/miss indicator if the first physical address is equal to the second physical address.

3. The virtual aliasing cache hit/miss detector of claim 1, wherein the comparator is configured to generate an aliased cache miss as the aliased cache hit/miss indicator if the first physical address is not equal to the second physical address.

4. The virtual aliasing cache hit/miss detector of claim 1, further comprising an aliased cache hit/miss validator configured to:
   receive a cache entry validity indicator indicative of a validity of the cache entry, and
   receive the preliminary aliased cache hit/miss indicator; and
   generate the aliased cache hit/miss indicator based on the cache entry validity indicator and the preliminary aliased cache hit/miss indicator.

5. The virtual aliasing cache hit/miss detector of claim 1, further comprising an aliased cache hit/miss validator configured to:
   receive the first physical address hit/miss indicator;
   receive the second physical address hit/miss indicator;
   receive the preliminary aliased cache hit/miss indicator; and
   generate the aliased cache hit/miss indicator based on the first physical address hit/miss indicator, the second physical address hit/miss indicator, and the preliminary aliased cache hit/miss indicator.

6. The virtual aliasing cache hit/miss detector of claim 5, wherein the aliased cache hit/miss validator is further configured to receive a cache entry validity indicator indicative of a validity of the cache entry.

7. The virtual aliasing cache hit/miss detector of claim 5, wherein the aliased cache hit/miss validator is comprised of AND-based logic.

8. The virtual aliasing cache hit/miss detector of claim 1, the VIVT cache entry invalidator further configured to receive a cache entry validity indicator indicative of a validity of the cache entry.

9. The virtual aliasing cache hit/miss detector of claim 8, wherein the VIVT cache entry invalidator is configured to invalidate the cache entry if:
   the non-aliased VIVT cache hit/miss indicator is a miss;
   the cache entry validity indicator indicates a valid cache entry; and
   the first physical address hit/miss indicator is a miss.

10. The virtual aliasing cache hit/miss detector of claim 8, wherein the VIVT cache entry invalidator is configured to invalidate the cache entry if:
    the non-aliased VIVT cache hit/miss indicator is a miss;
    the cache entry validity indicator indicates a valid VIVT cache entry; and
    the second physical address hit/miss indicator is a miss.

11. The virtual aliasing cache hit/miss detector of claim 8, wherein the VIVT cache entry invalidator is comprised of AND-based logic.

12. The virtual aliasing cache hit/miss detector of claim 8, wherein the invalidation indicator is provided to the VIVT cache.

13. The virtual aliasing cache hit/miss detector of claim 1, wherein the TLB comprises a micro-TLB configured to:
    generate a first preliminary physical address translated from the first virtual address; and
    generate a second preliminary physical address translated from the second virtual address; and
   wherein the micro-TLB is further configured to:
    generate the first physical address hit/miss indicator indicative of whether an entry for the first virtual address is contained in the TLB; and
    generate the second physical address hit/miss indicator indicative of whether an entry for the second virtual address is contained in the TLB.

14. The virtual aliasing cache hit/miss detector of claim 13, further comprising:
    a first multiplexer configured to:
       receive the first preliminary physical address;
       receive a third preliminary physical address generated by a unified TLB, the third preliminary physical address translated from the first virtual address;
       generate the first physical address based on at least one of the first preliminary physical address and the third preliminary physical address; and
    a second multiplexer configured to:
       receive the second preliminary physical address; and receive a fourth preliminary physical address generated by the unified TLB, the fourth preliminary physical address translated from the second virtual address; and generate the second physical address based on at least one of the second preliminary physical address and the fourth preliminary physical address.

15. The virtual aliasing cache hit/miss detector of claim 14, wherein the first multiplexer is further configured to receive a first select input based on the first physical address hit/miss indicator; and the second multiplexer is further configured to receive a second select input based on the second physical address hit/miss indicator.

16. The virtual aliasing cache hit/miss detector of claim 15, wherein the first multiplexer is configured to generate the first preliminary physical address as the first physical address if a virtual-to-physical address translation of the first virtual address is contained in the micro-TLB; and wherein the second multiplexer is configured to generate the second preliminary physical address as the second physical address if a virtual-to-physical address translation of the second virtual address is contained in the micro-TLB.

17. The virtual aliasing cache hit/miss detector of claim 14, further comprising an aliased cache hit/miss validator configured to:

receive the preliminary aliased cache hit/miss indicator from the comparator; and generate the aliased cache hit/miss indicator based on the preliminary aliased cache hit/miss indicator.

18. The virtual aliasing cache hit/miss detector of claim 17, the aliased cache hit/miss validator further configured to receive a cache entry validity indicator indicative of a validity of the cache entry.

19. The virtual aliasing cache hit/miss detector of claim 17, the aliased cache hit/miss validator further configured to receive the non-aliased VIVT cache hit/miss indicator generated by the VIVT cache.

20. The virtual aliasing cache hit/miss detector of claim 17, wherein the aliased cache hit/miss validator is comprised of AND-based logic.

21. The virtual aliasing hit/miss detector of claim 13, further comprising:

a first multiplexer configured to:
  receive the first preliminary physical address;
  receive a third preliminary physical address generated by a unified TLB, the third preliminary physical address translated from the first virtual address;
  generate the first physical address based on at least one of the first preliminary physical address and the third preliminary physical address, and wherein the comparator is configured to receive the second preliminary physical address as the second physical address.

22. The virtual aliasing cache hit/miss detector of claim 1 disposed in a memory management unit (MMU) of a central processing unit (CPU).

23. The virtual aliasing cache hit/miss detector of claim 1 integrated into a semiconductor die.

24. The virtual aliasing cache hit/miss detector of claim 1, the virtual aliasing cache hit/miss detector disposed in a device selected from the group consisting of a set top box, an entertainment unit, a navigation device, a communications device, a fixed location data unit, a mobile location data unit, a mobile phone, a cellular phone, a computer, a portable computer, a desktop computer, a personal digital assistant (PDA), a monitor, a computer monitor, a television, a tuner, a radio, a satellite radio, a music player, a digital music player, a portable music player, a digital video player, a video player, a digital video disc (DVD) player, and a portable digital video player, into which the virtual aliasing cache hit/miss detector is integrated.

25. A virtual aliasing cache hit/miss detector for a virtually-indexed virtually-tagged cache (VIVT cache), comprising:

a translation lookaside buffer (TLB) means configured to:
  receive a first virtual address;
  receive a second virtual address comprised of a tag of a cache entry resulting from an indexed read into the virtually-indexed virtually-tagged cache (VIVT cache) based on the first virtual address, responsive to the to indicating that the second virtual address is different from the first virtual address;
  generate a first physical address translated from the first virtual address;
  generate a second physical address translated from the second virtual address;
  generate a first physical address hit/miss indicator indicative of whether the first physical address corresponding to the first virtual address is contained in the TLB means; and
  generate a second physical address hit/miss indicator indicative of whether the second physical address corresponding to the second virtual address is contained in the TLB means;

a comparator means configured to:
  receive the first physical address and the second physical address;
  effectuate a generation of an aliased cache hit/miss indicator based on a comparison of the first physical address to the second physical address; and
  generate a preliminary aliased cache hit/miss indicator indicative of whether the first physical address equals the second physical address; and a VIVT cache entry invalidator means configured to:
  receive a non-aliased VIVT cache hit/miss indicator venerated by the VIVT cache;
  receive the first physical address hit/miss indicator;
  receive the second physical address hit/miss indicator; and
  generate an invalidation indicator indicative of whether to invalidate the cache entry based on the non-aliased VIVT cache hit/miss indicator, the first physical address hit/miss indicator, and the second physical address hit/miss indicator.

26. A method of providing a virtual aliasing cache hit/miss detector for a virtually-indexed virtually-tagged cache (VIVT cache), comprising:

receiving a first virtual address at a translation lookaside buffer (TLB);

receiving a second virtual address at the TLB comprised of a tag of a cache entry resulting from an indexed read into the virtually-indexed virtually-tagged cache (VIVT cache) based on the first virtual address, responsive to the tag indicating that the second virtual address is different from the first virtual address;

generating by the TLB a first physical address translated from the first virtual address;

generating by the TLB a second physical address translated from the second virtual address;

generating by the TLB a first physical address hit/miss indicator indicative of whether the first address corresponding to the first virtual address is contained in the TLB;

generating by the TLB a second physical address hit/miss indicator indicative of whether the second physical address corresponding to the second virtual address is contained in the TLB;

receiving the first physical address and the second physical address at a comparator;

effectuating a generation of an aliased cache hit/miss indicator by the comparator based on a comparison of the first physical address to the second physical address;

effectuating a generation of a preliminary aliased cache hit/miss indicator by the comparator indicative of whether the first physical address equals the second physical address;

receiving, by a VIVT cache entry invalidator, a non-aliased VIVT cache hit/miss indicator generated by the VIVT cache;

receiving, by the VIVT cache entry invalidator, the first physical address hit/miss indicator;

receiving, by the VIVT cache entry invalidator, the second physical address hit/miss indicator; and generating, by the VIVT cache entry invalidator, an invalidation indicator indicative of whether to invalidate the cache entry based on the non-aliased VIVT cache hit/miss indicator, the first physical address hit/miss indicator, and the second physical address hit/miss indicator.

27. A memory management unit (MMU), comprising:
a virtually-indexed virtually-tagged cache (VIVT cache); and
a virtual aliasing cache hit/miss detector, comprising:
a translation lookaside buffer (TLB) configured to:
receive a first virtual address;
receive a second virtual address comprised of a tag of a cache entry resulting from an indexed read into the VIVT cache based on the first virtual address, responsive to the tag indicating that the second virtual address is different from the first virtual address;
generate a first physical address hit/miss indicator indicative of whether a first physical address corresponding to the first virtual address is contained in the TLB; and
generate a second physical address hit/miss indicator indicative of whether a second physical address corresponding to the second virtual address is contained in the TLB;
a comparator configured to:
receive the first physical address and the second physical address;
effectuate a generation of an aliased cache hit/miss indicator based on a comparison of the first physical address to the second physical address; and
effectuate a generation of a preliminary aliased cache hit/miss indicator indicative of whether the first physical address equals the second physical address; and
a VIVT cache entry invalidator configured to:
receive a non-aliased VIVT cache hit/miss indicator generated by the VIVT cache;
receive the first physical address hit/miss indicator;
receive the second physical address hit/miss indicator; and
generate an invalidation indicator indicative of whether to invalidate the cache entry based on the non-aliased VIVT cache hit/miss indicator, the first physical address hit/miss indicator, and the second physical address hit/miss indicator.

28. The MMU of claim 27, further comprising a unified TLB; and wherein the TLB comprises a micro-TLB.

29. The MMU of claim 27 disposed in a central processing unit (CPU) or processor-based system.

* * * * *